No. 774,018. PATENTED NOV. 1, 1904.
C. WÜST-KUNZ.
ALTERNATING CURRENT MOTOR.
APPLICATION FILED JULY 29, 1901.
NO MODEL. 3 SHEETS—SHEET 2.

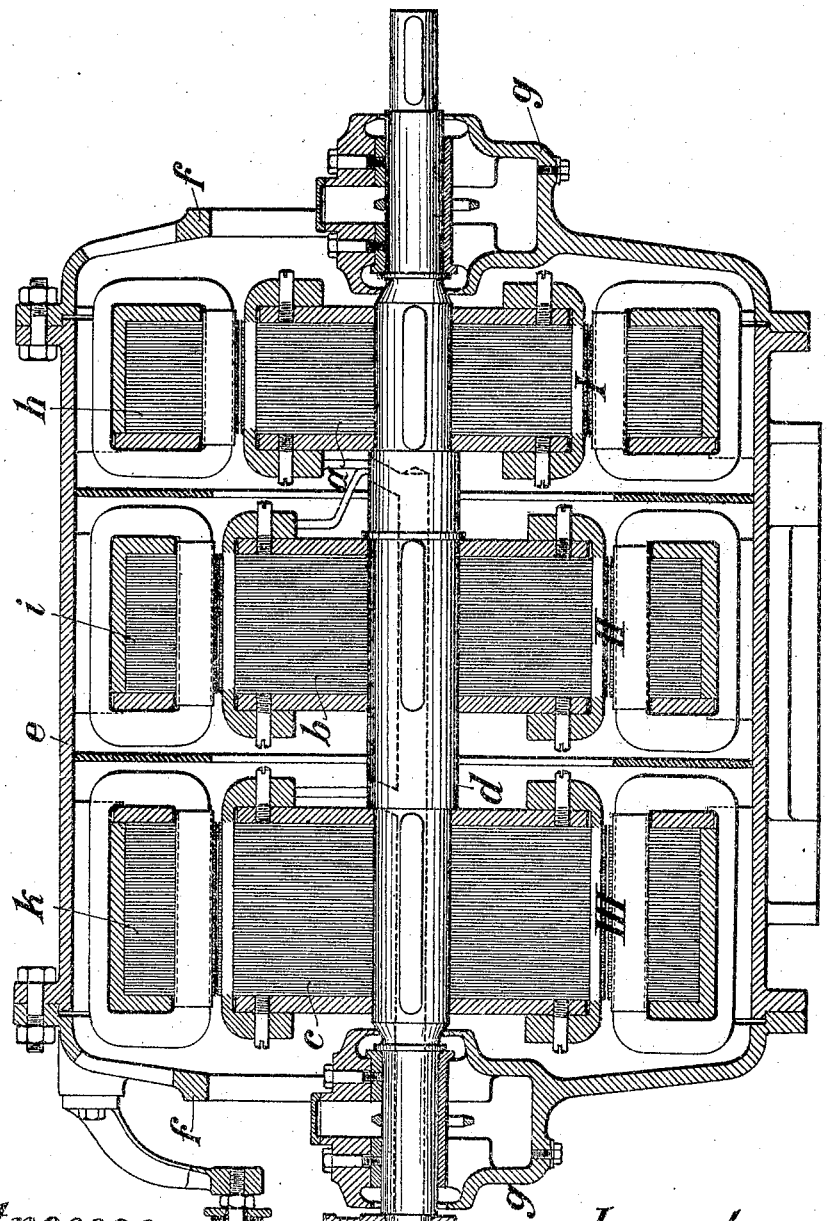

Figure II.

Witnesses:

Inventor
Caspar Wüst-Kunz
by Henry Orth
Atty

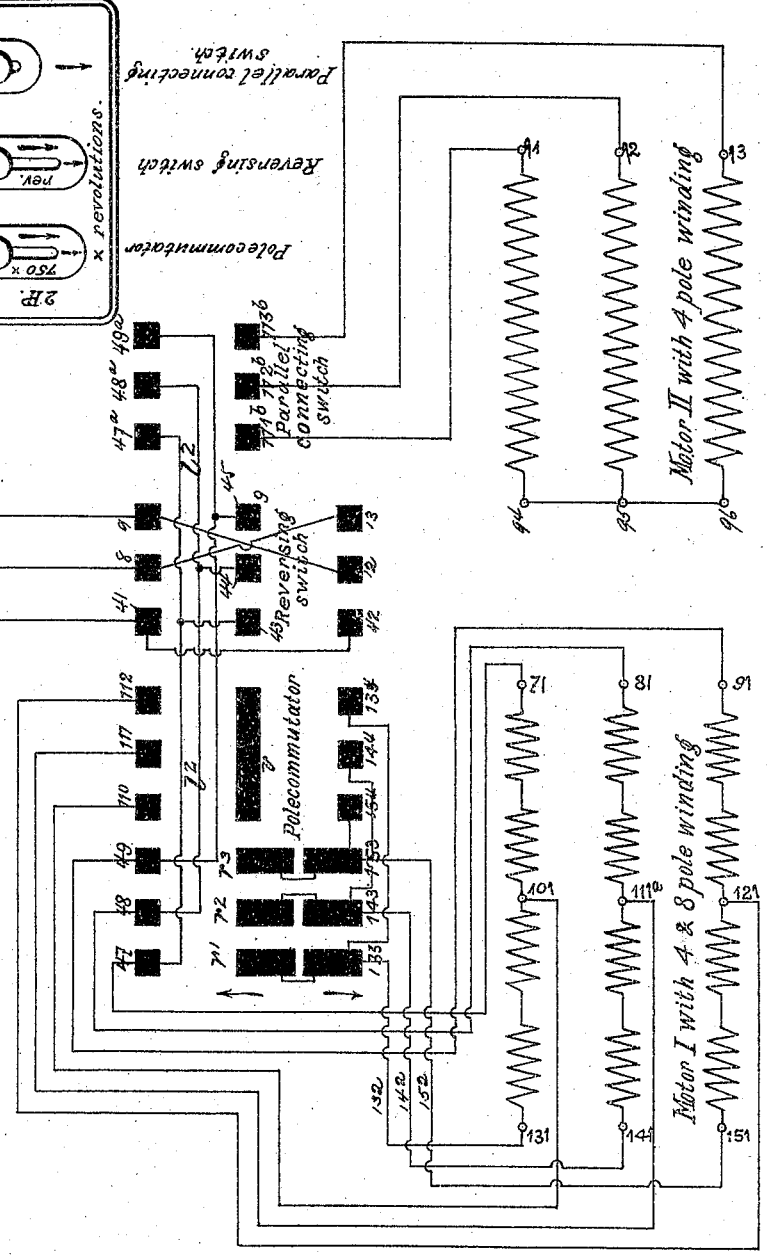

No. 774,018. Patented November 1, 1904.

UNITED STATES PATENT OFFICE.

CASPAR WÜST-KUNZ, OF SEEBACH, SWITZERLAND.

ALTERNATING-CURRENT MOTOR.

SPECIFICATION forming part of Letters Patent No. 774,018, dated November 1, 1904.

Application filed July 29, 1901. Serial No. 70,172. (No model.)

*To all whom it may concern:*

Be it known that I, CASPAR WÜST-KUNZ, a citizen of the Republic of Switzerland, residing at Seebach, Switzerland, have invented certain new and useful Improvements in Alternating-Current Motors, of which the following is a specification.

This invention relates to an alternate single or multi phase current motor which comprises a number of elements, each element being separately an electric motor and have their rotating parts mounted in the same casing on a common shaft. The elements can be switched into or out of circuit independently of one another, or they can be all connected in parallel or only a part of them. In the first case all the parts mounted on the shaft rotate therewith even though only one element may be effecting the rotation of the shaft. The motor can be arranged in such a way, for example, that the elements having a different number of poles for single or multi phase currents work at different tension (potential) at the same periodicity or at different periodicities with the same tension, or the tension and the periodicity may differ in each of the elements. Furthermore, the motor is constructed in such a way that, depending upon which element is included in circuit, either a certain power can be given off from the common shaft at different speeds, or various powers can be given off at the same speed or various powers at various speeds, the greatest power with the lowest speed being obtained by connecting all the elements in circuit in parallel. Such a motor with variable speeds is particularly suitable for the direct driving of tools, electric lifts and cranes, trams, and railway-vehicles and will act in a manner similar to a stepped pulley, so that the driving of the machine will be simplified, and in shaping large parts in a machine-tool or in driving up steep inclines with a vehicle it will be possible with such a motor to develop greater power at a reduced speed while maintaining the efficiency, while in the case of ordinary electric alternating multiphase-current motors used for the same purpose under these conditions the efficiency is very low, single-phase motors with variable speeds being not known at all. Since the elements are electrically independent of one another, they can always be arranged so as to give the highest efficiency for the work for which the motor is intended to be used.

An example of a motor according to this invention is shown in the accompanying drawings, in which like parts are similarly designed, and in which—

Figure 1 is a longitudinal section; Fig. 2, a diagrammatic view showing the connections; Fig. 3, a diagrammatic view showing two elements, the connections being such that the elements are in parallel and at the same time both elements can operate with the same number of poles; and Fig. 4 is a plan view of the control-box.

In Fig. 1 I have shown a section, and in Fig. 2 a diagram, illustrating a motor embodying my invention and in which the motor is shown as composed of three primaries or elements. The armatures or rotors $a$, $b$, and $c$ are closed on themselves and rigidly mounted on a shaft $d$, common to all of the elements. The field-magnets of the respective elements I, II, and III are fixed in a casing $e$, common to all of them, in the removable ends $f$ of which casing are formed bearings $g$ to support the shaft. Each element is wound for a different speed, and in the example herein given a fifty-cycle three-phase current is used, there being a different number of poles on each element, the element I having eight poles capable of being connected to produce, in effect, a four-pole element. The element II has four poles, and the element III has six poles. Each element is provided with a switch, all of similar construction, $p$ $q$ $r$, whereby they can be independently cut off from the supply-main as well as reversed. A cut-out $o$ is also supplied to simultaneously brake the circuit to all the elements.

Referring more particularly to Fig. 2, $l$ indicates a three-phase line, to which the three-phase motors $a$ $b$ $c$ are connected through their respective switches $r$ $q$ $p$ and the cut-out $o$. When the cut-out $o$ is closed, one of the three-phase wires 2 to each element is always in closed circuit. Supposing the cut-out $o$ to be closed and the reversing-switches in the position shown, no current will pass to the elements. If the connecting-pieces 5 and 6 of the switch $p$ be moved in the direction indicated by the arrow $m$, circuit will be closed between 11 and 12 and between 13 and 14, so that the circuit will be closed from the line through the cut-out $o$, wire 3, points 8 and 13, connecting-piece 6, point 14, wire 36 to one set of windings, and by wire 4 to points 9 and 12, connecting-piece 5, point 11, and wire 35 to a second set of windings and returning by wire 2, connected to the third set of windings. The armatures of the other two motors run idle and act as fly-wheels for the shaft $d$, common to all the armatures. To reverse motor $c$, the connecting-pieces 5 and 6 are moved in the direction indicated by the arrow $n$ to close circuit between 7 and 8 and between 9 and 10. The current through wire 3 will pass to 8, connecting-piece 5, points 7 and 11, wire 35 to the second winding and wire 14 to point 9, connecting-piece 6, points 10 and 14, and wire 36 to the first set of windings, thus reversing the direction of the current through wires 35 and 36 and reversing the motor. In like manner the element $b$ is operated by the reversing-switch $q$. When the connecting-pieces 15 and 16 are moved in the direction $m$, the current through the wire 3 will take the following course: 18 23 16 24 38 to the first winding and from wire 4 to 19 22 15 21 37 to the second winding, and when the connecting-pieces of motor $c$ are in a similar position these two elements $b$ and $c$ run parallel. To reverse the motor $b$, the connecting-pieces 15 and 16 are moved in the direction $n$. The current from wire 3 then takes the following course: 18 15 17 21 37 to the second winding, and that from wire 4 passes through 19 16 20 24 38 to the first winding. When 5 and 6 and 15 and 16 are moved in a similar position in the direction $n$, the two elements run in parallel in a reverse direction. When the two motors are running in parallel, a power is given greater than the power of the sum of the individual elements. In a like manner the motor $a$ is operated. The connecting-pieces 25 and 26 of the reversing-switch being moved in the direction $m$, current from wire 3 will take the following course: 28 33 26 34 40 to the first winding and that from wire 4 through 29 32 25 31 39 to the second winding. To reverse this motor, the connecting-pieces 25 and 26 are moved in the direction $n$, when current will pass as follows: by wires 3 28 25 27 31 39 to the second winding and by wires 4 29 26 30 34 40 to the first winding, returning to line from this and the other elements by wire 2. When these elements are running parallel, a power is given greater than the sum of the individual elements. If it is desired to run the motor with reduced starting-current, there are arranged on the hollow shaft $d$ and connected to the elements three collector-rings $r'$, $r^2$, and $r^3$, each electrically connected to one of the stator groups of one of the elements. Over these rings trail suitable brushes $s'$, $s^2$, and $s^3$, that supply current to the rings and stators of the respective elements, each phase connection having a suitable variable resistance included therein to gradually increase the current in the rotating element as it comes up to speed and indicated as a rotor-starter. Using the three windings separately with a fifty-cycle three-phase current, the speeds obtainable were fifteen hundred to fourteen hundred, one thousand to nine hundred, and seven hundred and fifty to seven hundred revolutions per minute, respectively, and the maximum power can be given by shunt-coupling all these units. The speed then varies from eight hundred to six hundred revolutions per minute, according to the power. The power of this combination is 9.1 horse-power.

Referring to Fig. 3, current from line $l$ is carried by wires 2 3 4 to the contacts 8, 9, and 41, the contact 41 being connected to the contact 42 and the one 9 to the contact 12 and the one 8 to contact 13. A three-phase branch line $l^2$ is connected to movable contacts 43, 44, and 45, respectively, and fixed contacts 47, 48, and 49, for the eight-pole element. The contact 47 is electrically connected to one phase winding of the stator at 71 and leaves at 131 by wire 132 to ring 133, electrically connected to contact 134, the movable element $v$ electrically connecting contacts 154, 144, and 134, returning by 144 or 154, rings $r^2$ or $r^3$, wire 142 or 152, contact 141 or 151 to the stator-winding for the second phase contacts 81 or 91 and 48 or 49 back to line $l^2$. Contact 49 for the third phase is connected to 91, the third phase winding 151, wire 152, contacts 153 and 154. In order to reduce the number of effective poles in this element from 8 to 4, the piece $v$ is moved to connect the contacts 110, 111, and 112, whereby current from the stator windings will be taken off at 101, 111$^a$, and 121—that is, electrically cutting out of circuit one-half the number of poles. Current then will pass from 47 to 71 through one-half of the winding of one phase of the stator to 101, to contact 110, piece $v$, and one of the other contacts 111 or 112—say 111 to 111$^a$—to the winding of the second phase, contact 81, contact 48 to line $l^2$. If in addition to these connections current be supplied through the split rings $r'$, $r^2$, and $r^3$, the parts of which are electrically connected, current will be supplied simultaneously at 71 and 131, 81 and 141, and 91 and 151, leaving the stator-coils by 101, 111$^a$, and 121, thereby operating the coils in parallel. When the movable contacts 43, 44, and 45 are in contact, respectively, with those 42, 12, and 13, the elements rotate in one direction, and when in contact with those 41, 8, and 9 they rotate in an opposite direction. The contacts 47$^a$, 48$^a$, and 49$^a$ when connected, respectively, with the contacts 111$^b$, 112$^b$, and 113$^b$ connect the second element in parallel with the eight-pole element, the respective stator-windings of this four-pole element being indicated at 91 to 24, 92 to 95, and 93 to 96.

Fig. 4 shows a top plan view of the actual structure of the pole-commutator, the reversing-switch, and the parallel connecting-switch.

Having thus described my invention, what I claim as new therein, and desire to secure by Letters Patent, is—

1. A rotary induction-motor comprising a plurality of elements to form a single machine having a casing, stator elements therein, each having a different number of poles, a rotor for each element, a shaft common to all the rotors, means to operate each element independently and means to operate one or more of the elements in parallel, whereby different speeds can be imparted to the shaft, substantially as described.

2. A rotary induction-motor comprising a plurality of elements to form a single machine, having a casing, stator elements, each having a different number of poles, a rotor element for each stator, means to operate each element independently of the others, means to electrically connect two or more of the elements in parallel and means to operate an element with a less number of poles than it is wound for, substantially as described.

3. A rotary induction-motor consisting of a plurality of elements, each element having a different number of poles and means to operate an element with one-half its number of poles, and a shaft common to all of the elements, substantially as described.

4. A rotary induction-motor consisting of a plurality of elements, each element having a different number of poles, means to operate each element independent of the others, means to electrically connect the elements in parallel and means to operate an element with one-half of its poles, the reduced number of poles being different from the number of poles in the other elements, and a shaft common to all of the elements, substantially as described.

5. A rotary induction-motor consisting of a plurality of elements, a single casing for all of the elements, a shaft common to all of them mounted in the ends of said casing, each element having a different number of poles, means to operate each element independently of the others, means to connect the elements in parallel, means to reverse the direction of rotation of the elements and means to electrically disconnect one-half of the poles of the element having the greatest number of poles, substantially as described.

6. A rotary induction-motor consisting of a plurality of elements, a single casing for all of the elements, a shaft common to all of them, each element having a different number of poles, means to operate each element independently of the others, devices to connect two or more of the elements in parallel and means to electrically disconnect one-half the number of poles of one of the elements, substantially as described.

In testimony whereof I have signed my name to this specification in the presence of two subscribing witnesses.

CASPAR WÜST-KUNZ.

Witnesses:
  MORITZ VEITH,
  A. LIEBERKNECHT.